United States Patent

Aumueller et al.

Patent Number: 5,496,877
Date of Patent: Mar. 5, 1996

[54] AMINO COMPOUNDS AS PROCESSING STABILIZERS FOR THERMOPLASTIC MATERIALS

[75] Inventors: Alexander Aumueller, Neustadt; Hubert Trauth, Dudenhofen, both of Germany

[73] Assignee: BASF Aktiengesellschaft, Ludwigshafen, Germany

[21] Appl. No.: 313,115

[22] PCT Filed: Apr. 20, 1993

[86] PCT No.: PCT/EP93/00951

§ 371 Date: Oct. 12, 1994

§ 102(e) Date: Oct. 12, 1994

[87] PCT Pub. No.: WO93/22376

PCT Pub. Date: Nov. 11, 1993

[30] Foreign Application Priority Data

Apr. 29, 1992 [DE] Germany .................. 42 14 027.7

[51] Int. Cl.⁶ .................................................. C08K 3/20
[52] U.S. Cl. .......................... 524/246; 524/247; 524/248
[58] Field of Search ................................ 524/246, 247, 524/248

[56] References Cited

U.S. PATENT DOCUMENTS 3,198,763  8/1965  Peterli .................. 524/248
3,485,786  12/1969  Rombusch ............. 524/246

OTHER PUBLICATIONS

Gächter und Müller Taschenbuch der Kunststoff Additive, Carl Hanser Verlag, 3rd ed., pp. 42–103 (1990).

*Primary Examiner*—Peter D. Mulcahy
*Attorney, Agent, or Firm*—Oblon, Spivak, McClelland, Maier, & Neustadt

[57] ABSTRACT

Compounds of the general formula (I) or (II)

$$A\text{---}\left[X\text{---}(CH_2)_m\text{---}N\begin{matrix}R^1\\R^2\end{matrix}\right]_n \quad (I)$$

$$B\bigcirc N\text{---}(CH_2)_m\text{---}N\begin{matrix}R^4\\R^5\end{matrix} \quad (II)$$

where m is 2 or 3, n is an integer from 1 to 6, $R^1$ and $R^2$ are, independently of one another, hydrogen, $C_1$- to $C_{18}$-alkyl, $C_3$- to $C_8$-alkenyl or $C_5$- to $C_{12}$cycloalkyl, $R^4$ and $R^5$ are, independently of one another, hydrogen, $C_1$- to $C_{18}$-alkyl, $C_3$- to $C_8$-alkenyl, $C_5$- to $C_{12}$-cycloalkyl or $C_7$- to $C_{12}$-phenylalkyl, in which the phenyl ring may be substituted by up to 3 $C_1$- to $C_{12}$-alkyl or $C_1$- to $C_{12}$-alkoxy groups, X is oxygen or $NR^3$, $R^3$ is an $R^1$ radical or a group of the formula $$\text{---}(CH_2)_m\text{---}N\begin{matrix}R^1\\R^2\end{matrix},$$

B completes a 3- to 12-membered heterocycle,

A when n=1 is an aliphatic radical or unsubstituted or substituted phenyl, and

A when n>1 is a divalent organic radical, are used as processing stabilizers for thermoplastic materials.

14 Claims, No Drawings

AMINO COMPOUNDS AS PROCESSING STABILIZERS FOR THERMOPLASTIC MATERIALS

During the processing of thermoplastic materials at elevated temperatures of from 250° to 350° C., for example during extrusion, chain decomposition or cross-linking reactions occur, especially in the presence of atmospheric oxygen, which undesirably change the mechanical and esthetic properties of the polymers and in some cases even render the plastic unusable.

In order to prevent these undesirable changes, processing stabilizers must be added to the plastics.

The prior art compounds used for this purpose include sulfides, phosphites, phosphonites or phenolic antioxidants or mixtures of such compounds (see R. Gächter and H. Müller, Taschenbuch der Kunststoff-additive, Carl Hanser Verlag, 3rd edition, Munich, Vienna, 1990, p. 42–103). DE-A 11 61 897 describes the stabilization of organic substances against damage by atmospheric oxygen using di- or tetramines containing specific aromatic radicals. However, the prior art compounds are not always satisfactory as regards effectiveness, thermal stability, low tendency to discoloration and compatibility.

It is an object of the present invention to provide novel, easily accessible processing stabilizers which do not have these disadvantages.

We have found that surprisingly this object is achieved by means of the amino compounds as claimed in claim 1.

The variable m is 2 or preferably 3. The variable n is an integer from 1 to 6, and n is preferably 1 or 2.

Alkyl groups for $R^1$ to $R^5$ may be branched or unbranched.

$C_1$–$C_{18}$-alkyl groups for $R^1$ to $R^5$ are for example methyl, ethyl, n-propyl, iso-propyl, n-butyl, iso-butyl, n-pentyl, 2-methylbutyl, 2- or 3-methylpentyl, n-hexyl, n-heptyl, n-octyl, 3-methylhexyl, n-decyl, tridecyl, lauryl or stearyl. $R^1$ and $R^2$ are preferably methyl, and $R^3$ is preferably $C_1$- to $C_{18}$-alkyl.

$C_3$–$C_8$-alkenyl groups for $R^1$ to $R^5$ are for example 2-butenyl, 2-pentenyl, 2-hexenyl, 2-heptenyl or 2-octenyl and especially allyl.

$C_5$–$C_{12}$-cycloalkyl groups for $R^1$ to $R^5$ are for example cyclopentyl, cyclohexyl, 4-methylcyclohexyl, cycloheptyl, cyclooctyl or cyclododecyl. Cyclohexyl is preferred.

$C_7$–$C_{12}$-phenylalkyl radicals for $R^1$ to $R^5$ are for example benzyl, 2-, 3- or 4-methylbenzyl, phenylethyl, phenylpropyl, phenylbutyl, 2-, 3- or 4-methoxybenzyl, 2-, 3- or 4-ethylbenzyl, 2-, 3- or 4-ethoxybenzyl or 4-dodecylbenzyl. Benzyl is preferred.

Hydrogen or methyl are particularly preferred for $R^1$ and $R^2$ and for $R^4$ and $R^5$. In addition, a group of the formula

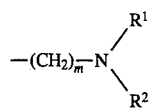

is particularly preferred for $R^3$.

The radical X is oxygen or $NR^3$, where $R^3$ has the specified meaning.

3- to 12-membered saturated or unsaturated heterocyclic radicals

are for example:

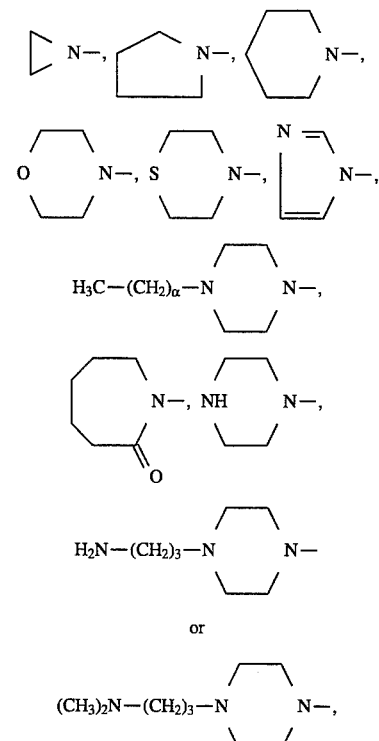

wherein α is a number between 0 and 17.

Groups derived from morpholine or piperazine are preferred.

If n=1, A may for example be, in addition to hydrogen: $C_3$- to $C_{24}$-alkenyl such as allyl, 1-pentenyl, 1-hexenyl, 1-heptenyl, 1-octenyl, 1-decenyl or 1-dodecenyl. Oleyl is preferred.

If A is $C_1$- to $C_{60}$-alkyl which may be interrupted by up to 29 carbon atoms or $NR^3$, A is for example:

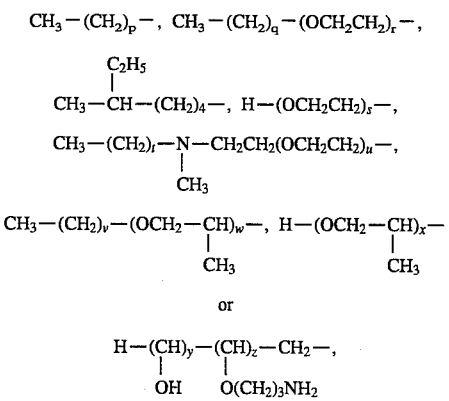

wherein:
 p is an integer from 0 to 24,
 q and r are integers from 0 to 30,
 s is an integer from 1 to 30,
 t and n are integers from 0 to 30, v and w are integers from 0 to 30, x is an integer from 1 to 30, and y and z are integers from 0 to 20.

Of these groups, $CH_3\text{-}(CH_2)_p$ radicals with p equal to 11 to 17 are preferred.

Examples of cycloalkyl groups A are: cyclopropyl, cyclopentyl, cyclohexyl, 4-methylcyclohexyl, 2,4-dimethylcyclohexyl, cycloheptyl, cyclooctyl or cyclododecyl.

Examples of $C_7$- to $C_{20}$-bicycloalkyl groups A are: adamantyl, norbornyl or 1- or 2-perhydronaphthyl.

If n>1, A denotes polyvalent organic radicals. Examples of $C_2$- to $C_{24}$-alkenyl groups A are:

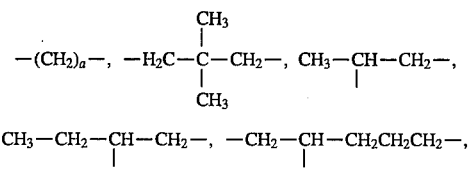

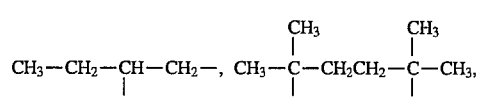

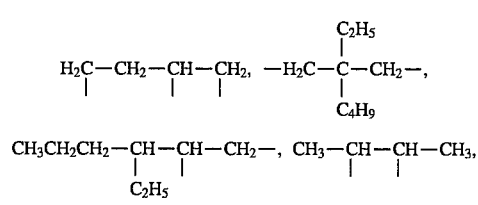

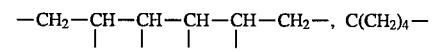

or

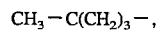

wherein a is an integer from 2 to 24.

$C_4$- to $C_{60}$-alkylene groups, which may be interrupted up to 29 times by $NR^3$ or oxygen, are for example:

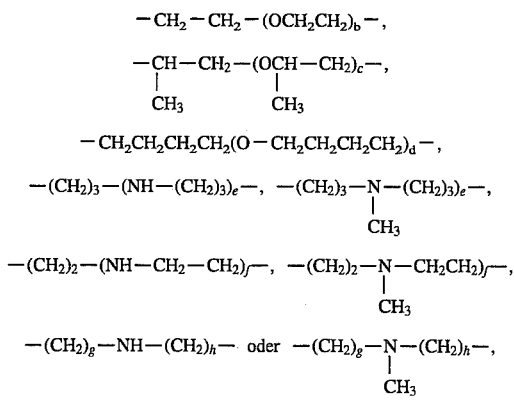

where
b=1 to 29,
c=1 to 19,
d=1 to 14,
e=1 to 19,
f=1 to 29,
g=2 to 58,
h=2 to 58, with the proviso that g+h≦60.

$C_3$- to $C_{12}$-alkylene radicals which may carry up to 6 hydroxyl, $C_1$- to $C_4$-alkoxy, amino, or $C_1$- to $C_3$-hydroxyalkyl groups, are for example:

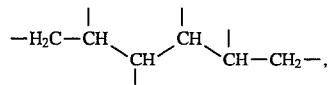

in which each of the free bonding positions may for example carry a hydroxyl, amino or methoxy group, but at least one of the free bonding positions is substituted by a group of the formula $$-O-CH_2CH_2CH_2-N\diagdown\begin{matrix}R^1\\R^2\end{matrix}$$

Examples of $C_5$- to $C_{12}$-cycloalkylene groups A are:

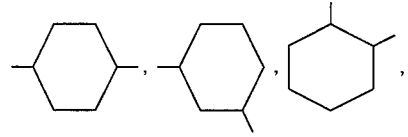

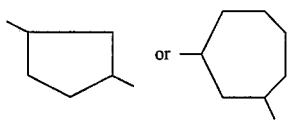

$C_7$- to $C_{24}$-bicycloalkylene or polycycloalkylene radicals are for example:

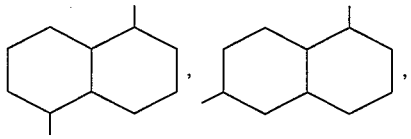

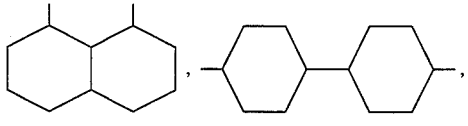

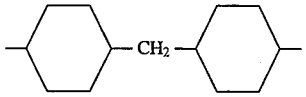

or

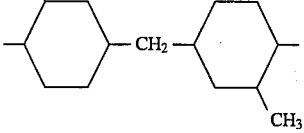

The compounds of the formula (I) and their preparation are known per se. They may easily be prepared for example by Michael addition of acrylonitrile onto monohydric or polyhydric alcohols or monoamines or polyamines, followed by reduction of the nitrile group (see O. Bayer, Angew. Chem. 61, 229 (1949) and the literature cited therein).

The compounds as claimed in claim 1 are outstandingly suitable for stabilizing polyolefins against oxygen and heat during processing. They are added to the material to be stabilized in a concentration of from 0.001 to 5% by weight, preferably from 0.01 to 2% by weight and particularly preferably from 0.1 to 0.5% by weight, before said material is processed.

All known equipment and methods for incorporating stabilizers or other additives into polymers may be used to mix the compounds to be used according to the invention with plastics.

The organic material stabilized according to the invention may if desired contain further additives, eg. antioxidants, light stabilizers, metal deactivators, antistatic agents, flame inhibitors, pigments and/or fillers.

Antioxidants and light stabilizers, which may be added in addition to the compounds I and II, are for example compounds based on sterically hindered phenols or sulfur- or phosphorus-containing costabilizers.

Examples of such phenolic antioxidants which may be mentioned are 2,6-di-tert-butyl-4-methylphenol, n-octadecyl β-(3,5-di-tert-butyl-4-hydroxyphenyl)propionate, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, 1,3,5-tris(3,5-di-tert-butyl- 4-hydroxybenzyl)isocyanurate, 1,3,5-tris[β-(3,5-di-tert-butyl-4-hydroxyphenyl)propionylethyl] isocyanurate, 1,3,5-tris(2,6-dimethyl-3-hydroxy-4-tert-butylbenzyl) isocyanurate, α-tocopherol and/or pentaerythritol tetrakis-[β-3,5-di-tert-butyl-4-hydroxyphenyl)propionate].

Examples of sulfur-containing antioxidants which may be mentioned are dilauryl thiodipropionate, dimyrisyl thiodiopropionate, distearyl thiodipropionate, pentaerythritol tetrakis(β-laurylthiopropionate) and pentaerythritol tetrakis(β-hexylthiopropionate).

Further antioxidants and light stabilizers which may be used together with the compounds I and II are for example 2-(2'-hydroxyphenyl)-benzotriazoles, 2-hydroxybenzophenones, aryl esters of hydroxybenzoic acid, α-cyanocinnamic acid derivatives, benzimidazole-carboxanilides, nickel compounds, oxaanilides and HALS compounds.

Examples of plastics that may be stabilized by the compounds as claimed in claim 1 are: polymers of monoolefins and diolefins, such as low density or high density polyethylene, polypropylene, linear 1-polybutene, polyisoprene, polybutadiene as well as copolymers of monoolefins or diolefins or mixtures of the aforementioned polymers.

Compounds of the general formulae I and II form synergistic mixtures with for example α-tocopherol. The mixing ratio may be 10:1 to 1:10. An amine:α-tocopherol ratio of 10:1 is preferred.

Examples of compounds to be used according to the invention include:

| Example No. | Structural formula | Remarks |
|---|---|---|
| 1 | 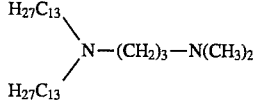 $H_{27}C_{13}$\\N—$(CH_2)_3$—$NH_2$ /$H_{27}C_{13}$ | technical $C_{13}$-isomer mixture |
| 2 | $C_{13}H_{27}$—N—$(CH_2)_3$—$NH_2$ \| H | technical $C_{13}$-isomer mixture |
| 3 | 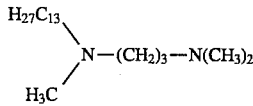 $H_{27}C_{13}$\\N—$(CH_2)_3$—$N(CH_3)_2$ /$H_{27}C_{13}$ | technical $C_{13}$-isomer mixture |
| 4 | 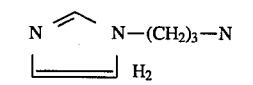 $H_{27}C_{13}$\\N—$(CH_2)_3$—$N(CH_3)_2$ /$H_3C$ | technical $C_{13}$-isomer mixture |
| 5 | 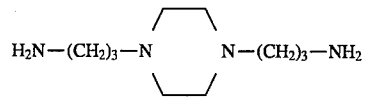 piperazine-N—$(CH_2)_3$—N, $H_2$ | technical $C_{13}$-isomer mixture |
| 6 | $H_2N(CH_2)_3O(CH_2)_2O(CH_2)_3NH_2$ | technical $C_{13}$-isomer mixture |
| 7 | $H_2N(CH_2)_3O(CH_2)_4O(CH_2)_3NH_2$ | technical $C_{13}$-isomer mixture |
| 8 | $H_2N(CH_2)_3O(CH_2)_2O(CH_2)_2O(CH_2)_3NH_2$ | technical $C_{13}$-isomer mixture |
| 9 | $H_2N(CH_2)_3O(CH_2)_4O(CH_2)_4O(CH_2)_3NH_2$ | technical $C_{13}$-isomer mixture |
| 10 | $H_2N(CH_2)_3O(CH_2)_6O(CH_2)_3NH_2$ | technical $C_{13}$-isomer mixture |
| 11 | $H_2N(CH_2)_3OCH_2CH[O(CH_2)_3NH_2](CH_2)_3$—$O(CH_2)_3NH_2$ | technical $C_{13}$-isomer mixture |
| 12 | $H_2N(CH_2)_3O[(CH_2)_4O]_n(CH_2)_3NH_2$ | n ~ 9.5 |
| 13 | $H_2N(CH_2)_3O[(CH_2)_4O]_n(CH_2)_3NH_2$ | n ~ 14 |
| 14 | $(CH_3)_2N(CH_2)_3N(CH_3)(CH_2)_3N(CH_3)_2$ | |
| 15 | $H_2N(CH_2)_3NH(CH_2)_2NH(CH_2)_3NH_2$ | |
| 16 | $(CH_3)_2N(CH_2)_3NH(CH_2)_3NH_2$ | |
| 17 | $H_2N(CH_2)_3NH(CH_2)_3NH(CH_2)_3$—$NH_2$ | |
| 18 | $H_2N(CH_2)_3NH(CH_2)_3NH(CH_2)_3NH(CH_2)_3$—$NH(CH_2)_3NH_2$ | |
| 19 | 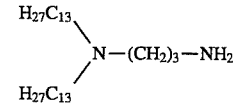 $H_2N$—$(CH_2)_3$—N(piperazine)N—$(CH_2)_3$—$NH_2$ | |
| 20 | $(CH_3)_2N(CH_2)_2N(CH_3)(CH_2)_2N(CH_3)_2$ | |

Use example 0.1% by weight, based on the material to be stabilized, of the stabilizer or stabilizer mixture is mixed with additive-free polypropylene and is processed and granulated several times at 260° C. in an extruder. After the first, third and fifth passes the melt flow index (MFI) of the substrate is measured by means of a melt viscometer according to DIN 53735. The experimental results are summarized in Table 1.

TABLE I

Melt flow index (MFI) of polypropylene after mutiple processing

| Stabilizer | MFI | | |
|---|---|---|---|
| | 1st pass | 3rd pass | 5th pass |
| none | 30.0 | 96.0 | —[1] |
| Comparison[2] | 19.5 | 29.0 | 53.5 |
| Example 20 | 21.5 | 26.5 | 42.0 |

TABLE I-continued

Melt flow index (MFI) of polypropylene after mutiple processing

| Stabilizer | MFI | | |
|---|---|---|---|
| | 1st pass | 3rd pass | 5th pass |
| Example 8 | 25.5 | 44.0 | 55.0 |
| Mixture 1[3)] | 22.0 | 26.5 | 38.0 |

[1)] cannot be granulated
[2)] compared with

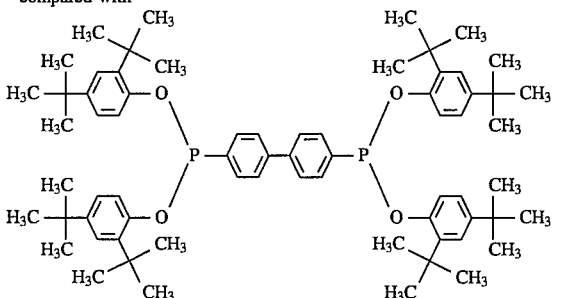

[3)] Mixture 1 is a mixture of the compound of Example 8 and α-tocopherol in the ratio 10:1.

We claim:

1. A process for stabilizing thermoplastic materials during processing, which comprises using compounds of the formula (I) or (II)

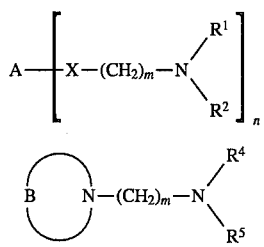

where m is 2 or 3, n is an integer from 1 to 6, $R^1$ and $R^2$ are, independently of one another, hydrogen, $C_1$- to $C_{18}$-alkyl, $C_3$- to $C_8$-alkenyl or $C_5$- to $C_{12}$-cycloalkyl, $R^4$ and $R^5$ are, independently of one another, hydrogen, $C_1$- to $C_{18}$-alkyl, $C_3$- to $C_8$-alkenyl, $C_5$- to $C_{12}$-cycloalkyl or $C_7$- to $C_{12}$-phenylalkyl, in which the phenyl ring is unsubstituted or substituted by up to 3 $C_1$- to $C_{12}$-alkyl or $C_1$- to $C_{12}$-alkoxy groups, X is oxygen or $NR^3$, $R^3$ is an $R^1$ radical or a group of the formula

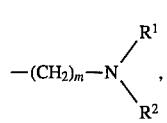

B completes a 3- to 12-membered saturated or unsaturated mononuclear or polynuclear heterocycle, which from 0 to 2 additional hetero atoms selected from the group consisting of nitrogen, oxygen and sulfur, wherein the further nitrogen atoms are unsubstituted or carry as substituents hydrogen, $C_1$- to $C_8$-alkyl or a group of the formula

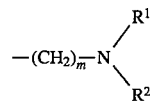

and for the heterocycle in addition to contain up to 3 carbonyl groups, $C_1$- to $C_8$-alkyl, phenyl, $C_7$- to $C_{12}$-phenylalkyl or $C_5$- to $C_{12}$-cycloalkyl substituents, and A when n=1 is hydrogen, $C_3$- to $C_{24}$-alkenyl, $C_1$- to $C_{60}$-alkyl, which is uninterrupted or interrupted by up to 29 oxygen atoms or $NR^3$ and is unsubstituted or substituted by up to 6 hydroxyl or amino groups, $C_3$- to $C_{12}$-cycloalkyl, which is unsubstituted or substituted by up to 3 $C_1$- to $C_{12}$-alkyl radicals, $C_7$- to $C_{20}$-bicycloalkyl or a group of the formula

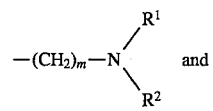 and

A when n>1 is $C_2$- to $C_{24}$-alkylene, $C_4$- to $C_{60}$-alkylene, which is uninterrupted or interrupted by up to 5 $NR^3$ groups or by up to 28 oxygen atoms, $C_3$- to $C_{12}$-alkylene, which carries up to 6 hydroxyl, $C_1$- to $C_4$-alkoxy, amino or $C_1$- to $C_3$-hydroxyalkyl groups, $C_5$- to $C_{12}$-cycloalkylene or $C_7$- to $C_{24}$-bicycloalkylene or polycycloalkylene, and when n> 1 the alkylene radicals are divalent or higher valence, as processing stabilizers for thermoplastic materials.

2. A process as claimed in claim 1, where n is 1 or 2.

3. A process as claimed in claim 1, where $R^1$ and $R^2$ or $R^4$ and $R^5$ are, independently of one another, hydrogen or $C_1$- to $C_4$-alkyl.

4. A process as claimed in claim 1, where $R^1$ $R^2$ or $R^4$ and $R^5$ are, independently of one another, hydrogen or methyl.

5. A process as claimed in claim 1, where $R^3$ is hydrogen, $C_1$- to $C_{18}$-alkyl or a radical of the formula

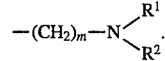

6. A process as claimed in claim 1, where B together with the nitrogen atom is a 5- or 6-membered, saturated or unsaturated heterocycle.

7. A process as claimed in claim 1, where B together with the nitrogen is a 5- or 6-membered heterocycle, which contains from 0 to 1 additional N or O atom.

8. A process as claimed in claim 1, where A, for n=1, is hydrogen or $C_1$- to $C_{18}$-alkyl.

9. A process as claimed in claim 1, where A, for n>1, is $C_2$- to $C_9$-alkylene, which is from divalent to hexavalent, or is $C_4$- to $C_{12}$-alkylene interrupted by

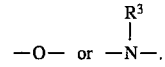

10. A process for stabilizing polyolefins during processing, which comprises using compounds of the formula (I) as claimed in claim 1.

11. A process for stabilizing polyethylene during processing, which comprises using compounds of the formula (I) as claimed in claim 1.

12. A process for stabilizing polypropylene during processing, which comprises using compounds of the formula (I) as claimed in claim 1.

13. A process for stabilizing thermoplastic materials during processing, which comprises using synergistic mixtures of compounds of the formula (I) or (II) as claimed in claim 1, or mixtures thereof, and α-tocopherol.

14. A process for stabilizing polyolefins during processing, which comprises using mixtures as claimed in claim 13.

* * * * *